July 7, 1964 M. P. MARCUS 3,140,467

MAGNETIC SWITCHING DEVICES

Filed Nov. 20, 1958

INVENTOR
MITCHELL P. MARCUS

BY Paul M. Brennan

AGENT 3,140,467
MAGNETIC SWITCHING DEVICES

Mitchell P. Marcus, Johnson City, N.Y., assignor to International Business Machines Corporation, New York, N.Y., a corporation of New York Filed Nov. 20, 1958, Ser. No. 775,279
5 Claims. (Cl. 340—147)

This invention relates to switching devices and more particularly to improved magnetic switches.

Data processing machines employ a memory which may be of the magnetic core type comprising a group of memory planes each consisting of a plurality of magnetic cores arranged in a matrix of columns and rows. Generally, each plane is provided with separate row windings each inductively coupling a row of cores and separate column windings each inductively coupling a column of cores. The corresponding row windings and the corresponding column windings are respectively connected serially so that a selected row and column winding intersect a group of cores occupying corresponding positions in the memory planes. Excitation of both a selected row and column winding causes the cores at the intersections of these windings to have their magnetic condition changed. Thus, a group of memory cores, corresponding to the bits of a data word, may be selected by applying a drive pulse coincidentally to a selected row and column winding of each memory plane in the group. Each plane is also provided with a sense winding inductively coupled to all of the cores in the plane to sense the change in magnetic conditions of the selected core in the plane.

Selection of row windings and column windings may be accomplished by a magnetic switch. One type of magnetic switch is the load sharing type which consists of a plurality of magnetic cores having a plurality of windings inductively coupled thereto in accordance with a predetermined combinatorial code. Each core has an output winding connected to a row or column winding of the memory. Drive means are provided for applying drive pulses coincidently to selected ones of the windings so that a desired one of the cores has its magnetic condition changed inducing a signal in its output winding which is used to drive a selected row or column winding of the memory. This arrangement permits the power from several sources to be combined into a single high powered output signal. Consequently, each driving source need only furnish a fraction of the total power required by the load.

One of the major problems encountered in magnetic switches is that of unwanted signals, termed noise, generated in the unselected cores when the selected core is being driven. Thus where the windings pass through all of the cores in predetermined combinatorial code, the magnetic effect due to the drive currents passing through an unselected core in the same sense is partially cancelled by the magnetic effect due to the drive currents passing through the unselected core in the opposite sense. However, the net magnetic effect causes the unselected core to be driven a small amount thereby inducing a small undesirable noise signal in the output winding thereof. This spurious output is applied to an unselected winding of the memory and may start to switch an unselected group of memory cores tending to destroy their stored information or produce incorrect outputs from the memory. Furthermore, the drivers must furnish the additional power which goes into these spurious signals and does no useful work.

Accordingly, an object of the present invention is to provide a new and improved magnetic switch.

Another object of the invention is to provide a novel magnetic switch which eliminates spurious outputs.

Still another object of the invention is to provide an improved load sharing magnetic switch.

A further object of the invention is to provide a novel load sharing magnetic switch which avoids spurious outputs.

Still another object of the invention is to provide a novel magnetic switch which is expandable without the introduction of spurious outputs.

A further object of the invention is to provide a load sharing magnetic switch which affords the maximum possible number of outputs for a given number of inputs, or conversely, for a given number of outputs, requires the minimum number of inputs.

A still further object of the invention is to provide an improved magnetic matrix switch.

Another object of the invention is to provide a novel load sharing magnetic matrix switch which reduces the driver power required from each driver.

In accordance with the present invention a magnetic switch is provided comprising a plurality of magnetic cores having a plurality of windings inductively coupled to each core in a different manner. Driver current is supplied coincidently to selected ones of the windings for selecting one of the cores in accordance with a predetermined combinatorial code. The selected windings are wound on the selected core in such a manner that the magnetic effect thereon due to the currents in the selected windings is additive to produce excitation of the selected core while the selected windings are wound on the remaining unselected cores in such a manner that the magnetic effect on the remaining unselected cores due to the currents in the selected windings is cancelled to produce no excitation of the remaining unselected cores.

Other objects of the invention will be pointed out in the following description and claims and illustrated in the accompanying drawings, which disclose, by way of example, the principle of the invention and the best mode, which has been contemplated, of applying that principle.

Figure 1:
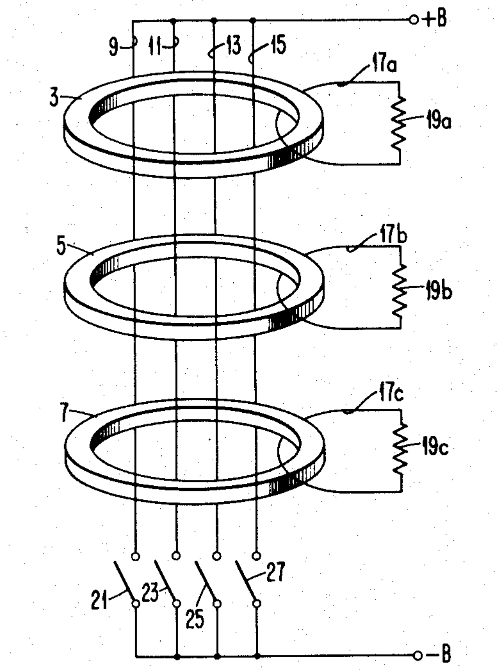
FIG. 1 is a schematic drawing of a magnetic switch embodying the present invention.

Referring now to FIG. 1, there is shown a schematic diagram of one embodiment of the present invention. It comprises a magnetic switch which includes three magnetic cores 3, 5 and 7 which may be toroidal in shape, though other suitable shapes may be used. Four input windings 9, 11, 13 and 15 are serially wound, in a different pattern, through the three cores to a source +B with the windings paired off so that half of the windings for a core pass through the core in a first sense, and the other half of the windings pass in opposite sense through each core. Each core has an output winding 17*a*–17*c*, which is connected to a row or column winding of the memory, here represented by the resistor load 19*a*–19*c*. Four switches 21, 23, 25 and 27 are respectively connected between the four input windings 9, 11, 13 and 15, and terminal −B, to enable selective energization of different windings. Although the switches are indicated as manually operated for the sake of simplicity, it is understood that any suitable type of switch may be employed, such as electronic tube devices, transistors, etc.

Figure 2:
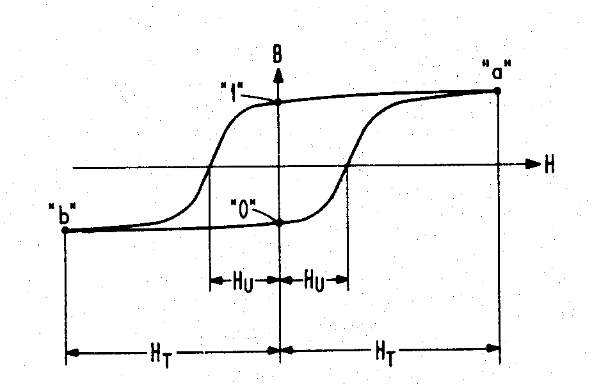
FIG. 2 is a hysteresis curve which is illustrated as an aid in understanding the embodiment in FIG. 1.

Referring now to FIG. 2, there is shown a typical hysteresis loop for a magnetic core. Magnetic cores possess two stable or remanent states of magnetism which are opposite in sense and, consequently, a magnetic core may operate as a binary element with one remanent state representing the binary digit 1 and the opposite remanent state representing the binary digit 0. The application of a drive current pulse to a wire passing through a magnetic core causing the core to follow the hysteresis loop as a function of the direction and magnitude of the current. The value of the magnitude of current necessary to generate a magnetomotive force sufficient to change the state of the core may be referred to as the threshold value. If the magnitude of the applied drive current pulse has a value which is less than the threshold value, then the core experiences some magnetic excursion on the hysteresis loop but when the current is removed the core will return to essentially the same remanent state at which it started. On the other hand, if the magnitude of the drive current pulse has a value which is equal to or greater than the threshold value and the current is applied in the proper direction, then the core changes from one remanent state to the other.

Considering unipolar drive current pulses, the sense of a winding may be defined as the direction in which it passes through the core. Accordingly, a winding in the "1" sense may arbitrarily be designated as passing over and under a core so that a unipolar drive current pulse applied thereto causes a magnetomotive force to be generated which tends to drive the core towards magnetic saturation in the 1 state. A winding in the "0" sense may be designated as passing under and over a core so that a unipolar drive current pulse applied thereto causes a magnetomotive force to be generated which tends to drive the core towards magnetic saturation in the 0 state. Thus, considering a core in the 0 state and a winding passing therethrough in the "1" sense, then if a unipolar drive current pulse is applied to the winding, the magnitude of which has a value greater than the threshold value, the core follows the hysteresis loop to the saturation point "*a*" and when the drive current pulse is terminated the core comes to rest in the 1 state. Likewise, considering the core in the 1 state and a winding passing therethrough in the "0" sense, then, if a unipolar drive current pulse is applied to the winding, the magnitude of which has a value greater than the threshold value, the core follows the hysteresis loop to the saturation point "*b*" and when the drive current pulse is terminated the core comes to rest in the 0 state. The change in flux, when the core switches from the 0 state to the 1 state, induces an output pulse in the output winding of the core which may be used as a read drive pulse for a selected column or row winding of memory. Likewise, the change in flux, when the core switches from the 1 state to the 0 state, induces an output pulse in the output winding of the core equal in magnitude but opposite in sense to that of the output pulse produced when the core switches from the 0 state to the 1 state and may be used as a write drive pulse for the selected column or row winding of memory. The use of 0 to 1 as a write pulse, and consequently, 1 to 0 as a read pulse is equally possible.

The principle of load sharing is to combine the magnetomotive forces generated by the currents in several driving windings so that the combined magnetomotive force has a value equal to that generated by the current which would otherwise be applied to a single driving winding. Consequently, each driving circuit need only furnish a fraction of the current required to change the state of the magnetic core. This reduction in current and power required from each driving circuit is especially advantageous where the current-carrying capacity of the driving switches must be kept small. Thus, in the present case the unit of current provided by each driver generates a unit magnetomotive force $H_U$ which is equal to $$H_T/\frac{N}{2}$$

where $H_T$ is the total magnetomotive force required to drive the core and N is the total number of driving windings. In applying the principle of load sharing, N windings are inductively coupled to a core with one half of the windings passing through the core in the "1" sense and the other half of the windings passing through the core in the "0" sense. Consequently, $N/2$ windings pass through the core in the "1" sense and $N/2$ windings pass through the core in the "0" sense. Hence, during read time of a memory cycle, by applying drive current pulses coincidently to the $N/2$ windings in the "1" sense, $N/2$ units of magnetomotive force are combined to drive a core, which is in the 0 state, to the 1 state. The change in flux, when the core switches from the 0 state to the 1 state, induces an output pulse in the output winding of the core which may be used as a read drive pulse for a selected column or row winding of memory. Likewise, during write time of a memory cycle, by applying drive current pulses coincidently to the $N/2$ windings in the "0" sense, $N/2$ units of magnetomotive force are combined to drive the core, which is in the 1 state, to the 0 state. The change in flux, when the core switches from 1 state to the 0 state, induces an output pulse in the output winding of the core equal in magnitude but opposite in sense to that of the first mentioned output pulse which may be used as a write drive pulse for the selected column or row winding of memory.

Referring to FIG. 1, the present invention contemplates a load sharing magnetic switch consisting of a plurality of cores having N windings inductively coupled thereto with a different winding pattern for each core so that a single core may be uniquely selected without generating spurious outputs from any of the remaining unselected cores. To accomplish this result, a particular winding pattern must be developed.

The basic winding pattern, considered on the basis of the winding sense previously described, can be represented tabularly as $$(1,0)$$

This, then, is the tabular representation of a 2 input, 1 output switch, comprising a single core, with a "1" winding to set the core in a 1 state and a "0" winding to set the core in a 0 state.

To obtain the winding pattern for the next larger complete matrix, that is the next larger matrix which is capable of utilizing all usable combinations of inputs, the following procedure is employed:

(1) The first row of the present winding pattern is extended in both directions by adding the same values to each side of the existing values, to give the first row of the new pattern, thus $$\leftarrow \ldots .111(1,0)000\ldots . \rightarrow$$

(2) Form two rows of the new winding pattern, for each row of the present winding pattern, by repeating the present row values in the first three quadrants of the tabular area, and inserting the complement of the present values in the fourth quadrant, thus

| II | I |
|---|---|
| Present Row Values | Present Row Values |
| Present Row Values | Complement of Present Row Values |
| III | IV |

The next larger complete winding pattern will accordingly have one more than twice the number of rows in the present pattern.

As a first illustrative example, consider the manner of deriving the winding pattern for the 4 input, 3 output matrix shown in FIG. 1 of the drawings.

First the basic element "10" is expanded in accordance with the first value by adding the same values once to each side so that the pattern for the first row becomes:

"1100"

In accordance with rule two, the basic pattern is expanded by placing the row value, for each row of the present pattern ("10") in the first 3 quadrants of the tabular area and the complement value of the row values for the present pattern ("01") in the fourth quadrant, thus

| | |
|---|---|
| 10 | 10 |
| 10 | 01 |

Now combining the row found by the first rule with the two additional rows found by the second rule, the winding pattern for the 4 input, 3 output matrix is 1100
1010
1001

The winding pattern given above in tabular form corresponds to the winding pattern of the cores shown in FIG. 1. Each row of the winding pattern corresponds to a core, and each column to the serially connected drive windings. Inspection of the drawing will show that, for the first core 3, the first and second windings, from left to right, thread the core in an "over and under" or "1" sense, and the third and fourth windings thread the core in an "under and over" or "0" sense, thus corresponding to the "1100" pattern of the first row in the table. Similarly, the first and third windings thread core 5 in the "1" sense, while the second and fourth windings thread this core in the "0" sense. The windings on the other cores may be compared with the winding pattern in similar fashion.

In the operation of the magnetic switch, selection of a core to be driven from the 0 state to the 1 state is accomplished by exciting all of the windings which pass through that core in the "1" sense in accordance with the read selection pattern. Likewise, selection of a core to be driven from the 1 state to the 0 state is accomplished by exciting all of the windings which pass through that core in the "0" sense in accordance with the write selection pattern.

Thus, assume that all of the cores 3, 5 and 7 are in the 0 state and that it is desired to select core 5, corresponding to the pattern 1010, to be changed to the 1 state. Switches 21 and 25 are accordingly closed to apply drive current pulses via windings 9 and 13. Referring to the winding pattern above, it will be noted that core 5 is the only core receiving 2 units of magnetomotive force in the "1" sense which, as can be seen from the equation previously defined, is required to switch the core. Consequently, core 5 will be driven from the 0 state to the 1 state inducing an output pulse in the output winding 17*b* to drive the load 19*b*.

If the switch is employed to supply driving pulses to a magnetic core storage matrix, the output pulse may correspond to a "read" drive pulse to read data out of storage.

Referring again to the winding pattern, it will be noted that when drive current pulses are applied to windings 9 and 13 to select core 5, cores 3 and 7 each receive one unit of magnetomotive force in the "1" sense and one unit of magnetomotive force in the "0" sense which cancel each other so that no spurious output pulses are applied to any of the output windings 17*a* or 17*c*. In a similar manner, cores 3 and 7 may be selected by applying drive current pulses to the proper windings so that the combined magnetomotive force drives selected core from the 0 state to the 1 state while the remaining unselected magnetic cores receive zero excitation resulting in no spurious outputs being generated in the output windings of the unselected cores.

When a new data word is to be written or the previously read out data word is to be rewritten into the selected group of cores in memory, a write driver pulse must be generated which is equal in magnitude but opposite in polarity to that of the read driver pulse previously generated. This is accomplished by restoring the previously selected core of the magnetic switch from the 1 state to the 0 state. Accordingly, switches 23 and 27 are closed to apply drive current pulses via windings 11 and 15. Referring to the winding patterns, it will be noted that the previously selected core 5, corresponding to the pattern 1010, is the only core now receiving 2 units of magnetomotive force in the "0" sense. Consequently, core 5 will be driven from the 1 state to the 0 state inducing an output pulse in the output winding 17*b* which is equal in magnitude but opposite in polarity to the output pulse previously produced when the core was switched from the 0 state to the 1 state. The remaining cores will each receive balanced inputs, so that no spurious outputs are generated at this time. In a similar manner, either of the other cores 3 and 7 may be selected by applying drive current pulses to the proper windings so that the combined magnetomotive force drives the selected core from the 1 state to the 0 state while the remaining unselected magnetic cores receive zero excitation resulting in no spurious outputs being generated in the output windings of the unselected cores.

In view of the result that is obtained with this type of magnetic switch, the choice of input voltage and current supplied through the selected core, the number of turns on the input and output windings, and the core dimensions and material are a matter of transformer design and are not of major concern here. Whether linear or square loop core material is used in a particular application does not affect the ability of the input windings to excite only one core. It should be apparent from the foregoing description that the magnetic switch of the present invention combines the principle of load sharing with the elimination of spurious outputs. As a result, the switch economizes on the amount of power required from each driver since the additional power which would normally go into the spurious outputs is not required.

Figure 3:
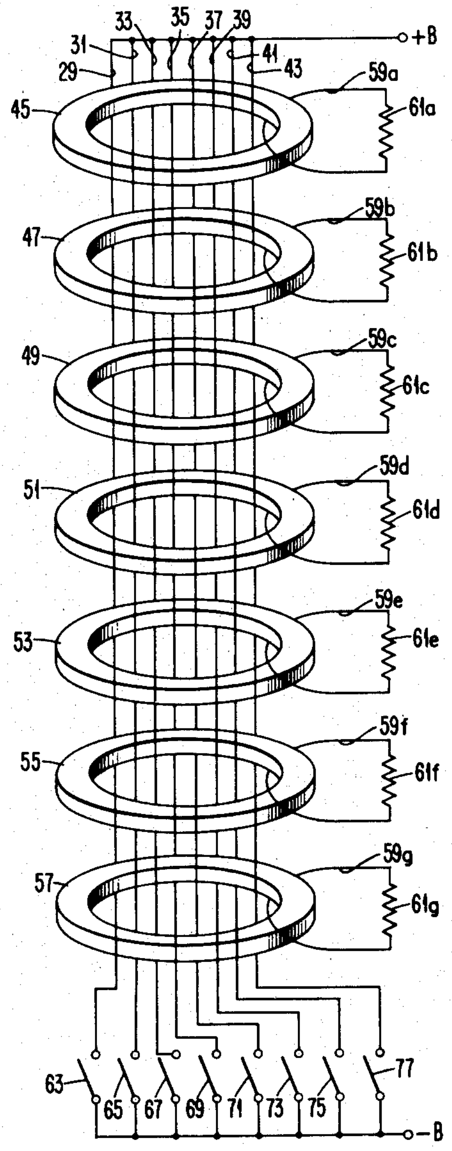
FIG. 3 is a schematic drawing of another embodiment of the present invention.

Referring now to FIG. 3 of the drawings, there is shown a magnetic switch arrangement employing seven cores, and having 7 outputs selected by proper combinations of 8 inputs. The winding pattern for this matrix can be developed from the pattern given above for the 3 output matrix as follows:

(1) The first row is developed from the first row of the previous pattern by repeating values on each side thereof, until the total number of values equals the number of inputs in the new pattern. Accordingly, "1100" becomes "11110000."

(2) Each row of the old matrix is repeated in three quadrants and the complement in the fourth quadrant of a two-row winding pattern area in the new pattern. The first row of the previous pattern, 1100, thus becomes 1100 1100
1100 0011

The second row of the previous pattern, 1010, becomes 1010 1010
1010 0101

The third and last row of the previous pattern, 1001, becomes 1001 1001
1001 0110

Combining all of the new winding pattern rows, the new pattern for the 8 input, 7 output switching matrix becomes 11110000
11001100
11000011
10101010
10100101
10011001
10010110

Examination of the input windings 29, 31, 33, 35, 37, 39, 41 and 43 linking cores 45, 47, 49, 51, 53, 55 and 57 will show the correspondence with the winding pattern given above. Each of these cores is provided with an output winding 59*a* through 59*g*, connected to loads 61*a* through 61*g* respectively. To select a particular one of the cores for reading or writing, half of the total input windings are energized in the proper combination, by the closing of selected ones of the switches 63, 65, 67, 69, 71, 73, 75 and 77.

For example, if core 51 is to be energized in the "1" sense, switches 63, 67, 71 and 75 are closed to energize windings 29, 33, 37 and 41, all of which thread core 51 in the "1" sense, and which are balanced between the "1" sense and the "0" sense in all other cores. The parts are proportioned and arranged so that the total flux required to switch core 51 is four times the amount supplied by energization of a single winding. Accordingly, not only will core 51 be fully energized, but the inputs to the remaining cores will be balanced out, so that an output signal will be provided only from winding 59*d* to load 61*d*, and no spurious signals will be generated in the remaining output windings.

Conversely, if core 51 is to be energized in the "0" sense, switches 65, 69, 73 and 77 are closed, energizing windings 31, 35, 39 and 43, all of which thread core 51 in the "0" sense, so that a reverse polarity output is provided from output winding 59*d* to load 61*d*, while the inputs to each of the reversing cores are cancelled.

The previous descriptions have illustrated the manner of developing the winding pattern for a complete matrix or switch, utilizing all of the usable combinations of inputs, to provide outputs which are one less in number than the total number of inputs. Where an incomplete matrix is required, one or more of any of the rows of the winding patterns is not used. For example, a 6 output matrix would use the winding patterns shown above, but with any selected one row thereof eliminated. Having derived the winding pattern, it is apparent that the rows may be interchanged, or the columns may be interchanged without affecting the required operation. Likewise, all zeros and ones may be interchanged without affecting the result, and combinations of interchanged rows, interchanged columns, and interchanged ones and zeros may be used.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic switch comprising a plurality of magnetic elements, a plurality of windings equal to the least power of two which is greater than the number of said elements, said windings being coupled to each of said elements in accordance with a predetermined combinatorial code, one half of said windings having one magnetizing sense and the other half of said windings having the opposite magnetizing sense, and unipolar drive means for applying current coincidently to selected ones of said windings, which constitute one half the number of said windings, the selected windings being wound on one of said elements in such a manner that the magnetic effect generated by the current in said selected windings is effective to produce magnetic saturation switching of said one element, said selected windings being wound on all of the remaining elements of said switch in such a manner that the magnetic effect generated by the current in said selected windings is cancelled to produce no excitation of any of said remaining elements of said switch, whereby the state of said one element is changed and an output is provided from said one element only.

2. A magnetic switch comprising a plurality of magnetic elements, each of said elements being provided with an output winding, a plurality of driving circuits equal in number to the least power of two which is greater than the number of said elements, a plurality of input windings on each of said elements, and equal to the number of said driving circuits, half of said input windings being coupled to the associated element in a first magnetizing sense and the other half of said input winding being coupled to the associated element in the opposite magnetizing sense, said input windings being connected to said driving circuits in non-complemented binary combinatorial codes so that coincident unipolar energization of said driving circuits in binary combinations energizes one half of the total number of windings to produce magnetic saturation switching of all of said input windings for one of said elements only in a selected sense and cancellation of magnetization in all of the remaining memory elements of said switch, whereby the state of said selected element is changed and an output is provided from said selected element only.

3. A magnetic switch comprising a plurality of magnetic elements, a plurality of windings inductively coupled to each of said elements and equal to the least power of two which is greater than the number of said elements, one half of said windings being coupled to said elements in accordance with said predetermined combinatorial code and in a first magnetizing sense, the other half of said windings being coupled to said elements in accordance with said predetermined combinatorial code and in a second magnetizing sense, and selective unipolar drive means for applying current coincidently to selected one half the total number of said windings, the selected one half of the total number of said windings being wound on one of said elements in such a manner that the sum of the magnetomotive force generated by the current in said selected windings is sufficient to fully excite only said one element, thereby changing the state of said one element to provide an output therefrom.

4. A magnetic switch as set forth in claim 3 in which each winding is inductively coupled to the associated element in one of two magnetizing senses designated as "1" and "0" respectively, the windings being connected to said elements in accordance with a winding pattern developed from a basic 2 input winding pattern

10 in which all values in a horizontal row represent the windings on a given element, and the values in a vertical column designate the windings in the switch which are serially connected, the basic winding pattern being expanded so that the winding pattern for a number of inputs equal to a given power of two is formed by one row of values in which equal values of ones and zeros are added on each end to the corresponding row of equally divided ones and zeros of the next smaller pattern, and two rows of winding patterns are developed for each row of the next smaller pattern by repeating the pattern for the given row of the next smaller pattern in the first three quadrants of the pattern area, and complementing the pattern of the given row of the next smaller pattern in the fourth quadrant of the pattern area.

5. A magnetic switch as claimed in claim 4, in which the unipolar drive means for coincidently energizing said windings which are coupled to a selected one of said elements in said first sense produce excitation of the selected elements in said first sense, the selected windings being coupled to all of the remaining windings in balanced groups to produce no net excitation thereof, whereby an output is produced only from the selected one of said elements.

References Cited in the file of this patent

UNITED STATES PATENTS

| | | |
|---|---|---|
| 2,691,152 | Stuart-Williams | Oct. 5, 1954 |
| 2,734,182 | Rajchman | Feb. 7, 1956 |
| 3,026,509 | Buser | Mar. 20, 1962 |